United States Patent
Dhing et al.

(10) Patent No.: US 12,464,065 B2
(45) Date of Patent: Nov. 4, 2025

(54) MODIFYING THE TYPE OF INTERACTION BETWEEN A MOBILE COMPUTING DEVICE AND A PERIPHERAL DEVICE BASED ON PROXIMITY

(71) Applicant: Google LLC, Mountain View, CA (US)

(72) Inventors: Rohan Dhing, Mountain View, CA (US); Miroslav Bojic, San Francisco, CA (US); Zhengnan Zhao, Sunnyvale, CA (US); Michael DelGaudio, San Francisco, CA (US); Henry Holland, London (GB); Mårten Jönsson, Malmö (SE); Ding Xu, Mountain View, CA (US); Henry Newton-Dunn, Palo Alto, CA (US); Mikkel Crone Koser, Copenhagen (DK)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/680,343

(22) Filed: May 31, 2024

(65) Prior Publication Data

US 2024/0323272 A1    Sep. 26, 2024

Related U.S. Application Data

(63) Continuation of application No. 17/310,050, filed as application No. PCT/US2019/014306 on Jan. 18, 2019, now Pat. No. 12,052,383.

(51) Int. Cl.
*H04M 1/72412* (2021.01)
*H04W 4/02* (2018.01)
*H04W 4/021* (2018.01)

(52) U.S. Cl.
CPC ....... *H04M 1/72412* (2021.01); *H04W 4/021* (2013.01); *H04W 4/023* (2013.01)

(58) Field of Classification Search
CPC .... H04M 1/72412; H04W 4/021; H04W 4/02
See application file for complete search history.

(56) References Cited

U.S. PATENT DOCUMENTS

| 7,649,456 B2 | 1/2010 | Wakefield |
| 9,053,653 B2 | 6/2015 | Myers |

(Continued)

FOREIGN PATENT DOCUMENTS

| CN | 103650554 A | 3/2014 |
| EP | 2890059 A1 | 7/2019 |

(Continued)

OTHER PUBLICATIONS

Communication pursuant to Article 94(3) EPC from counterpart European Application No. 19704134.6 dated Apr. 22, 2024, 6 pp.

(Continued)

*Primary Examiner* — Steven S Kelley
(74) *Attorney, Agent, or Firm* — Shumaker & Sieffert, P.A.

(57) ABSTRACT

In general, the subject matter described in this disclosure can be embodied in methods, devices, and program products for modifying interactions between a mobile device and a peripheral device based on proximity. The mobile device monitors a wireless communication channel and receives a transmission from the peripheral device over the channel indicating that the mobile device is located within a first zone of proximity to the peripheral device. The mobile device determines distance values between the devices. When the mobile device determines that a distance value satisfies a threshold value, the mobile device visually indicates that it is within a second zone of proximity to the peripheral device. As a result of the mobile device receiving data from the peripheral device using a second communication protocol, the mobile device determines that it is (Continued)

located within a third zone of proximity to the peripheral device, and performs an action.

19 Claims, 7 Drawing Sheets

(56) References Cited

U.S. PATENT DOCUMENTS

| | | | |
|---|---|---|---|
| 9,356,995 B1* | 5/2016 | Schaeffer, III | G06Q 50/01 |
| 9,654,981 B2 | 5/2017 | Lazaridis et al. | |
| 10,032,365 B1 | 7/2018 | Xu et al. | |
| 10,448,198 B2 | 10/2019 | Tran | |
| 2010/0222000 A1 | 9/2010 | Sauer et al. | |
| 2010/0253507 A1* | 10/2010 | Jung | H04M 1/72412 |
| | | | 340/539.13 |
| 2011/0105097 A1* | 5/2011 | Tadayon | H04W 4/02 |
| | | | 455/418 |
| 2011/0183614 A1* | 7/2011 | Tamura | H04W 4/21 |
| | | | 455/41.2 |
| 2012/0282914 A1 | 11/2012 | Alexander | |
| 2013/0079037 A1* | 3/2013 | Dobyns | H04W 4/029 |
| | | | 455/456.3 |
| 2014/0057569 A1* | 2/2014 | Toivanen | G06F 3/04842 |
| | | | 455/41.3 |
| 2014/0235265 A1 | 8/2014 | Slupik | |
| 2014/0242913 A1 | 8/2014 | Pang | |
| 2014/0280865 A1* | 9/2014 | Albertson | H04W 4/023 |
| | | | 709/224 |
| 2014/0364056 A1 | 12/2014 | Belk et al. | |
| 2015/0004912 A1* | 1/2015 | Diamond | H04W 4/023 |
| | | | 455/41.2 |
| 2015/0077231 A1 | 3/2015 | Kang et al. | |
| 2015/0189426 A1* | 7/2015 | Pang | H04R 3/00 |
| | | | 381/77 |
| 2015/0268903 A1 | 9/2015 | Baba | |
| 2017/0078786 A1* | 3/2017 | Schobel | H04M 1/724094 |
| 2017/0289766 A1* | 10/2017 | Scott | H04W 8/005 |
| 2017/0372600 A1 | 12/2017 | Palin et al. | |
| 2018/0047091 A1 | 2/2018 | Ogden et al. | |
| 2018/0058863 A1 | 3/2018 | Meyer et al. | |
| 2018/0130096 A1* | 5/2018 | Dun | G06Q 30/0261 |
| 2018/0165948 A1 | 6/2018 | Shin | |
| 2018/0239349 A1 | 8/2018 | Rasmussen et al. | |
| 2018/0338114 A1 | 11/2018 | Chiang | |
| 2019/0006891 A1* | 1/2019 | Park | H02J 50/90 |
| 2019/0045043 A1 | 2/2019 | Kim et al. | |
| 2019/0097954 A1 | 3/2019 | Hajdu et al. | |
| 2019/0098444 A1 | 3/2019 | Hwang et al. | |
| 2019/0306245 A1 | 10/2019 | Chandra et al. | |
| 2020/0029167 A1* | 1/2020 | Bostick | H04R 1/1083 |
| 2020/0169427 A1 | 5/2020 | Wu et al. | |
| 2021/0368317 A1 | 11/2021 | Fish | |
| 2022/0052867 A1 | 2/2022 | Nakano | |
| 2022/0101719 A1 | 3/2022 | Bojic et al. | |
| 2023/0164530 A1 | 5/2023 | Tessler | |

FOREIGN PATENT DOCUMENTS

| | | |
|---|---|---|
| WO | 2017135599 A1 | 8/2017 |
| WO | 2018017660 A1 | 1/2018 |

OTHER PUBLICATIONS

Communication pursuant to Article 94(3) EPC from counterpart European Application No. 19704134.6 dated Feb. 20, 2023, 7 pp.
Communication pursuant to Article 94(3) EPC from counterpart European Application No. 19704134.6 dated Oct. 17, 2023, 7 pp.
First Office Action and Search Report, and translation thereof, from counterpart Chinese Application No. 201980089370.8 dated Oct. 18, 2023, 24 pp.
International Preliminary Report on Patentability from International Application No. PCT/US2019/014306, mailed Jul. 29, 2021, 12 pp.
International Search Report & Written Opinion from Application No. PCT/US2019/014306, mailed Sep. 23, 2019, 20 pp.
Prosecution History from U.S. Appl. No. 17/310,050, dated Feb. 21, 2023 through May 15, 2024, 107 pp.
Response to Communication pursuant to Article 94(3) EPC dated Oct. 17, 2023, from counterpart European Application No. 19704134.6 filed Jan. 29, 2024, 99 pp.
Response to Communication pursuant to Article 94(3) EPC dated Feb. 20, 2023, from counterpart European Application No. 19704134.6 filed Jun. 16, 2023, 16 pp.
Response to Communication Pursuant to Rules 161(1) and 162 EPC dated Aug. 25, 2022, from counterpart European Application No. 19704134.6, filed Mar. 4, 2022, 100 pp.
Second Office Action from counterpart Chinese Application No. 201980089370.8 dated May 15, 2024, 7 pp.
Extended Search Report from counterpart European Application No. 24185115.3 dated Oct. 10, 2024, 17 pp.
Notice of Intent to Grant and Search Report, and translation thereof, from counterpart Chinese Application No. 201980089370.8 dated Oct. 12, 2024, 6 pp.

* cited by examiner

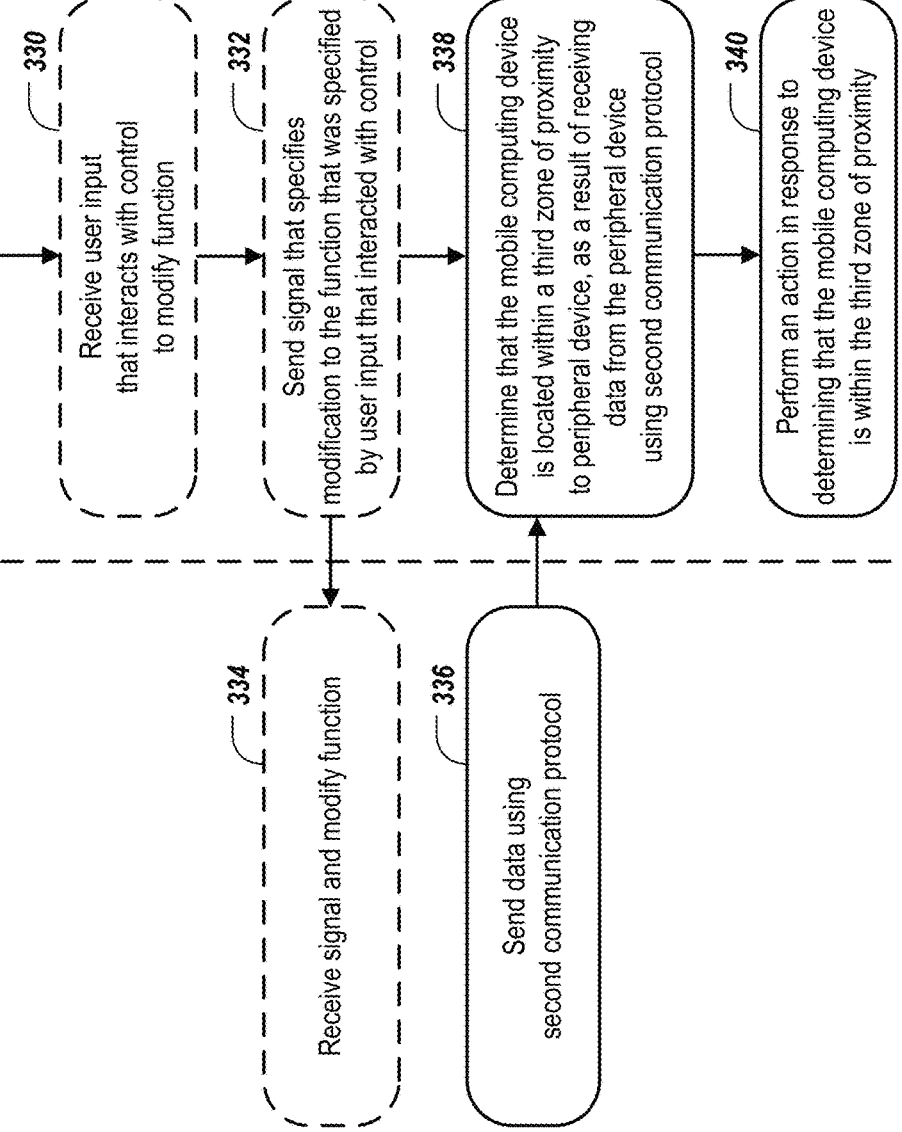

US 12,464,065 B2

MODIFYING THE TYPE OF INTERACTION BETWEEN A MOBILE COMPUTING DEVICE AND A PERIPHERAL DEVICE BASED ON PROXIMITY

RELATED APPLICATION

This application is a Continuation of U.S. application Ser. No. 17/310,050, filed Jul. 13, 2021, which is a 371 Application of PCT Application No. PCT/US2019/014306, filed Jan. 19, 2018, the entire contents which are incorporated herein by reference.

TECHNICAL FIELD

This document generally relates to modifying the type of interaction between a mobile computing device and a peripheral device based on proximity of the mobile computing device to the peripheral device.

BACKGROUND

Mobile devices, such as smartphones, can communicate with other devices using various wireless technologies, such as Bluetooth, Wi-Fi, or another wireless networking protocol. Configuring a mobile device so that it can communicate with another device may involve performing various configuration steps, such as installing a software application on the mobile device that is programmed to facilitate communication between the mobile device and the other device, installing a device driver, and/or providing device identifiers, passwords, or other credentials. Once the mobile device and the other device are connected, the mobile device and the other device can share data, and/or the mobile device may function as a controller for the other device.

SUMMARY

This document describes techniques, methods, systems, and other mechanisms for modifying the type of interaction between a mobile computing device and a peripheral device based on proximity of the mobile computing device to the peripheral device.

As additional description to the embodiments described below, the present disclosure describes the following embodiments.

Embodiment 1 is a computer-implemented method. The method comprises monitoring, by a mobile computing device, a wireless communication channel. The method comprises receiving, by the mobile computing device, a transmission from a peripheral device over the wireless communication channel using a first communication protocol, the transmission identifying a type of the peripheral device, receipt of the transmission indicating that the mobile computing device is located within a first zone of proximity to the peripheral device. The method comprises establishing, by the mobile computing device in response to the mobile computing device receiving the transmission from the peripheral device, a process that determines, at a plurality of times, a respective plurality of distance values between the mobile computing device and the peripheral device. The method comprises determining, by the mobile computing device, that a first distance value of the plurality of distance values fails to satisfy a threshold value, indicating that the mobile computing device is not within a second zone of proximity to the peripheral device. The method comprises determining, by the mobile computing device, that a second distance value of the plurality of distance values satisfies the threshold value, indicating that the mobile computing device is within the second zone of proximity to the peripheral device. The method comprises modifying, by the mobile computing device in response to the mobile computing device determining that the second distance value satisfies the threshold value, a display of the mobile computing device to visually indicate that the mobile computing device is within the second zone of proximity to the peripheral device. The method comprises determining, by the mobile computing device after the mobile computing device has determined that the second distance value satisfies the threshold value, that the mobile computing device is located within a third zone of proximity to the peripheral device, as a result of the mobile computing device receiving data from the peripheral device using a second communication protocol that has a shorter range than the first communication protocol, the third zone of proximity being smaller than the second zone of proximity and being smaller than the first zone of proximity. The method comprises performing, by the mobile computing device, an action in response to the mobile computing device determining that the mobile computing device is located within the third zone of proximity to the peripheral device.

Embodiment 2 is the method of embodiment 1, wherein the first communication protocol comprises Bluetooth Low Energy transmissions, and the second communication protocol comprises Near Field Communication transmissions.

Embodiment 3 is the method of embodiment 2, wherein determining the plurality of distance values between the mobile computing device and the peripheral device does not include communicating over the wireless communication channel.

Embodiment 4 is the method of any one of embodiments 1 through 3, wherein modifying the display of the mobile computing device to visually indicate that the mobile computing device is within the second zone of proximity to the peripheral device includes presenting an indication of the type of the peripheral device on the display of the mobile computing device without the mobile computing device receiving user input after receiving the transmission from the peripheral device.

Embodiment 5 is the method of embodiment 4, wherein performing the action includes performing the action without the mobile computing device receiving user input after receiving the transmission from the peripheral device.

Embodiment 6 is the method of embodiment 4, wherein modifying the display of the mobile computing device to visually indicate that the mobile computing device is within the second zone of proximity to the peripheral device includes presenting a user interface that enables user input to modify the action designated to be performed in response to the mobile computing device determining that the mobile computing device is located within the third zone of proximity to the peripheral device.

Embodiment 7 is the method of any one of embodiments 1 through 6, wherein modifying the display of the mobile computing device to visually indicate that the mobile computing device is within the second zone of proximity to the peripheral device includes presenting a user interface that includes a control to modify a function of the peripheral device, the transmission received by the mobile computing device from the peripheral device specified the function, and the mobile computing device selected the control to modify the function for inclusion in the user interface from among multiple controls available for inclusion in the user interface based on the transmission having specified the function in distinction to other of the multiple functions.

Embodiment 8 is the method of embodiment 7, further comprising receiving, by the mobile computing device, user input that interacts with the control to modify the function, and sending, by the mobile computing device, a signal for receipt by the peripheral device that specifies the modification to the function that was specified by the user input that interacted with the control, to cause the peripheral device to perform an operation that modifies the function.

Embodiment 9 is the method of embodiment 8, wherein the function comprises changing volume of the peripheral device.

Embodiment 10 is the method of any one of embodiments 1 through 9, wherein performing the action includes the mobile computing device sending a request that the peripheral device perform the action.

Embodiment 11 is the method of any one of embodiments 1 through 10, wherein the peripheral device is a proxy peripheral device for another peripheral device, and performing the action includes the mobile computing device sending a request that the another peripheral device perform the action.

Embodiment 12 is the method of any one of embodiments 1 through 11, wherein the second communication protocol includes Near Field Communication protocol, and the method further comprises initiating Near Field Communication transmissions for receipt by the peripheral device in response to the mobile computing device either (i) receiving the transmission from the peripheral device using the first communication protocol, or (ii) determining that the second distance value satisfies the threshold value.

Embodiment 13 is directed to a computing system, comprising one or more processors, and one or more computer-readable devices including instructions that, when executed by the one or more processors, cause performance of operations according to the method of any one of embodiments 1 through 12.

Particular implementations can, in certain instances, realize one or more of the following advantages. Low-power techniques may be used by mobile computing devices for monitoring a wireless communication channel for transmissions potentially broadcast by peripheral devices, such that device battery power is conserved with respect to more power-intensive monitoring techniques. A mobile computing device may be used to immediately interact with a peripheral device without waiting for a pairing operation to occur, and without selecting the peripheral device from among a list of peripheral devices to which a user wants to connect. Interactions between the mobile computing device and the peripheral device may be performed without establishing any type of communication session between the mobile computing device and the peripheral device. Data may be shared between devices at a time when the mobile computing device is initially proximate to the peripheral device, such that a user of the mobile computing device does not experience lag when attempting to control the peripheral device. Rather than provide large amounts of data for rendering custom-designed user interfaces, peripheral devices may send lesser amounts of data specifying available functions and corresponding setting values. Mobile computing devices that receive the data may use a template mechanism to render interfaces using common interface components that support functions specified by peripheral devices.

The details of one or more implementations are set forth in the accompanying drawings and the description below. Other features, objects, and advantages will be apparent from the description and drawings, and from the claims.

DESCRIPTION OF DRAWINGS

FIGS. 3A-C show a diagram of an example process for modifying a type of interaction between a mobile computing device and a peripheral device based on proximity.

Like reference symbols in the various drawings indicate like elements.

DETAILED DESCRIPTION

Figure 1:
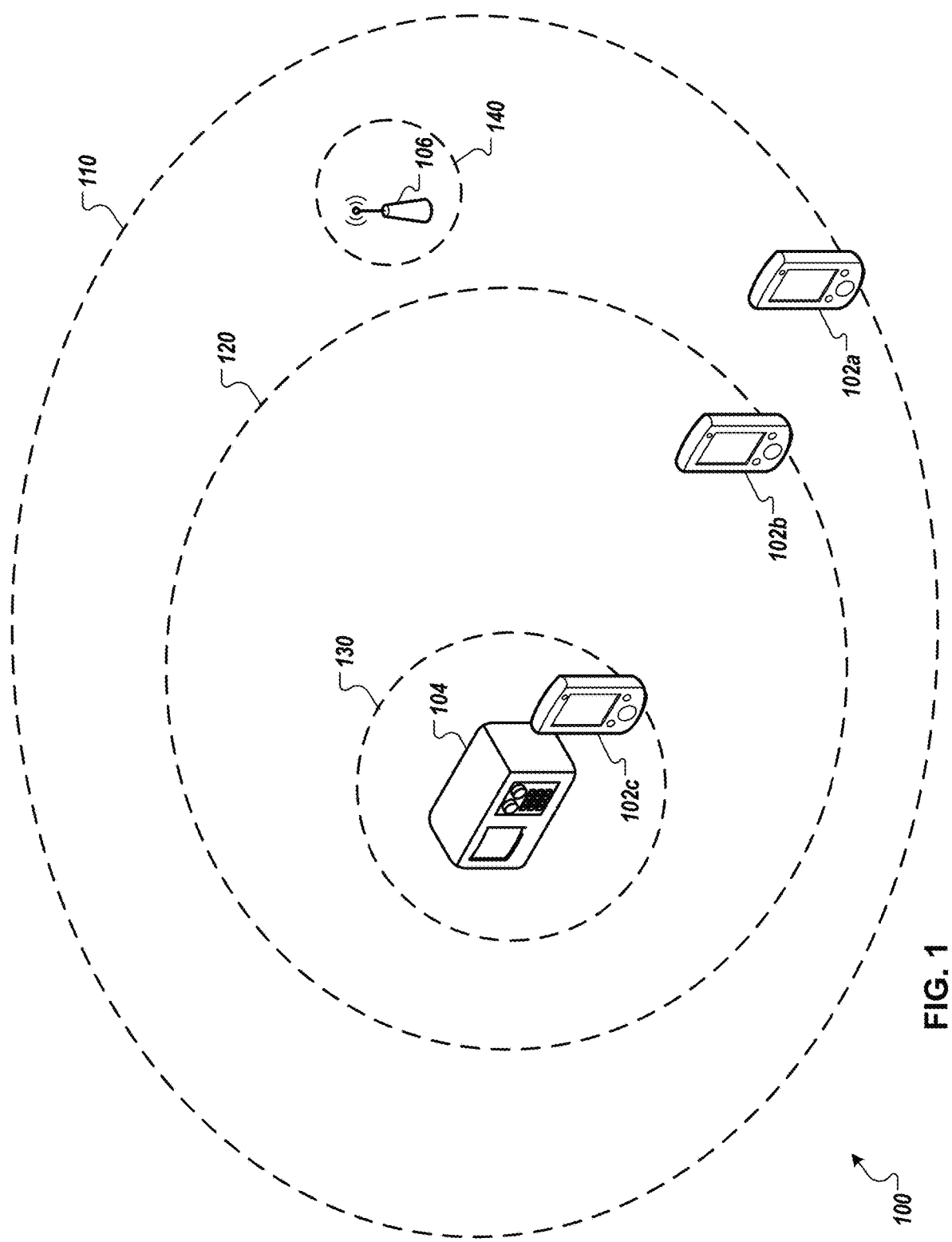
FIG. 1 is a conceptual diagram of an example system for modifying a type of interaction between a mobile computing device and a peripheral device based on proximity.

This document generally describes modifying the type of interaction between a mobile computing device and a peripheral device based on proximity of the mobile computing device to the peripheral device. In some examples, the mobile computing device may recognize that the peripheral device is near the mobile computing device, and in response the mobile computing device may automatically display a user interface that allows a user to control one or more functions of the peripheral device. Should the user bring the mobile computing device even closer to the peripheral device and place the mobile computing device in contact with peripheral device, the mobile computing device and/or the peripheral device may perform a default action.

In general, connecting to peripheral devices and interacting with the devices has typically involved many actions to be performed by a user of a mobile computing device, such as turning on and off various antennas, installing various applications, signing up for various services, pairing the devices, managing the devices, configuring the devices, and so forth. Such actions generally require significant understanding of an underlying technology stack by the user. Further, a number of peripheral devices that may be connected with mobile computing devices is increasing, with different techniques being used by peripheral device manufacturers for connecting to and communicating with mobile computing devices. This complexity and inconsistency may diminish the experience of the mobile device user, and may lead to decreased performance of the mobile device due to the various (and possibly conflicting) applications, drivers, and configuration settings needed to communicate with a variety of peripheral devices. The techniques described in this document can allow users to control peripheral devices in a more efficient and intuitive manner, and can improve device performance.

This next portion of this disclosure describes a high-level overview of an example interaction between a mobile computing device and a peripheral device, before providing a more-detailed description of such interactions with respect to the figures. In this example interaction, a user has checked into a hotel and is walking to his hotel room. The hotel room includes a radio peripheral device that is regularly broadcasting data that identifies its presence. The user has a mobile telephone, but that mobile telephone has never previously communicated with the radio peripheral device. The operating system of the mobile telephone is configured to regularly listen to multiple pre-designated radio frequency communication channels to determine whether any peripheral devices are broadcasting their presence over those channels. In this example, the radio is broadcasting its presence using Bluetooth Low Energy (BLE) communication protocols, and the mobile telephone is listening for broadcasts using BLE communication protocols.

As the user walks into his hotel room, his mobile telephone detects a transmission from the radio. The transmission includes information that identifies the peripheral device as a radio, and potentially includes other information, such as functions that the mobile telephone is permitted to control. In response to the mobile telephone receiving the transmission, the mobile telephone phone begins a distance-determination process that determines a distance between the mobile telephone and the radio peripheral device. The distance-determination process can involve performing time-of-flight analysis techniques for communications sent over one or more radio frequency channels that are different than the initial radio frequency channel over which the radio broadcast its presence. The mobile telephone may have responded to the initial broadcast from the radio by sending back a response over the same radio frequency channel including data that specifies that the distance-determination process and related communications are to begin (e.g., requesting that the radio either transmit or listen to transmissions on the one or more different radio frequency channels).

The mobile telephone may be referred to as being in a first zone of proximity to the radio when the mobile telephone has detected presence of the radio and has begun its distance-determination processes. While in the first zone of proximity, the mobile telephone may provide no indication to the user that the mobile telephone has detected the presence of the radio. In other examples, the mobile telephone may indicate that it has detected a radio (e.g., by displaying a notification icon shaped like a radio and/or providing an auditory notification), but the user may not be able to control functions of the radio while in the first zone.

The mobile telephone may regularly analyze results of the distance-determination process to determine whether the phone has moved within a threshold distance of the radio associated with a smaller, second zone of proximity to the radio (e.g., roughly arm's length to the radio). Upon determining that the phone is within the threshold distance of the radio, the mobile telephone may begin to perform operations associated with the second zone of proximity. In some examples, the mobile telephone displays an indication of the radio (e.g., with a status-bar notification or pop-up notification). In some examples, the mobile telephone displays a user interface that includes a select set of controls for modifying respective functions of the radio. For example, once the mobile phone determines that it is within the threshold distance of the radio, (i) the user interface may automatically appear on the display of the mobile telephone, or (ii) an icon indicating presence of the radio and selectable to cause presentation of the user interface may automatically appear on the display of the mobile telephone.

The peripheral device may not be one that the user (or his mobile phone) has previously encountered, and the technologies described herein may enable the user to immediately interact with the peripheral device using his mobile telephone without waiting for a pairing operation to occur, and without selecting the peripheral device from among a list of peripheral devices to which the user wants to connect. Rather, mere proximity to the peripheral device may prompt controls to appear on the display of the user's mobile telephone. Indeed, the interactions described herein may be performed without establishing any type of communication session between the mobile telephone and the peripheral device. For example, the transmissions by the peripheral device may be broadcast to any mobile device in near proximity to the peripheral device, and the transmissions may indicate the type of peripheral device and the type of one or more functions that are controllable via the above-described user interface.

For example, the radio peripheral device may have transmitted data indicating that its volume and on/off functions are controllable by the mobile telephone via the above-described user interface. The data that identifies these functions may be transmitted by the radio in its initial broadcast that announces presence to any mobile computing device in its vicinity, or the data may be sent by the radio to the mobile telephone in response to the mobile telephone receiving the broadcast and sending a responsive communication to the radio that prompts the radio to send the data.

Continuing with the above-described example, once the user walks to within a few feet of the radio, his mobile telephone begins to display a user interface that includes controls for changing the volume of the radio and turning the radio on or off. The user wants to turn the radio on and turn the volume up, and therefore interacts with the controls presented on his telephone to perform these functions. In response, the mobile telephone sends a transmission requesting that the radio perform these functions. In some examples, the mobile telephone sends such requests as a broadcast without performing, with the radio, a handshaking process or another type of process that establishes a connection interval.

There is a third zone of proximity in which the mobile telephone and radio are touching or close enough that they are almost touching. When the mobile telephone is placed in this third zone of proximity, a default action is triggered on either the mobile telephone or the radio, or both. For example, the mobile telephone may begin repeatedly sending an NFC signal as soon as the mobile phone is within either the first zone of proximity or the second zone of proximity, and the radio may include an NFC tag that generates a responsive radio frequency transmission when the mobile telephone is sufficiently close to the NFC tag (e.g., 10 cm). The mobile telephone may detect the responsive transmission, and either perform a default action itself or request that the radio perform a default action, or both. For example, the mobile telephone may automatically pair with the radio, and music or other audio requested by the user to be played on the mobile telephone may be output by the radio.

Many different types of interactions between a mobile computing device and one or more peripheral devices are possible, as explained throughout the rest of this disclosure. Many of the interactions involve an ability of a mobile computing device to quickly control a peripheral device, with the types of wireless communications and the user interface functions changing based on the zone of proximity.

Referring now to FIG. 1, that figures shows a conceptual diagram of an example system 100 for modifying a type of interaction between a mobile computing device 102 and a peripheral device 104 based on proximity. The mobile computing device 102 is illustrated in FIG. 1 as being a touchscreen smartphone, for example, but mobile computing device 102 may be another type of computing device, such as a smart watch, a tablet, a personal digital assistant, or another suitable type of computing device. The peripheral device 104 is illustrated in FIG. 1 as being an alarm clock, for example, but peripheral device 104 may be another suitable type of device, such as a radio, a television, a camera, a printer, a thermostat, an appliance, a robot, a vehicle, a stationary or mobile computing device, and so forth. The term "peripheral device," as used in this application, refers to any sort of device that can communicate with a mobile computing device and can perform one or more operations based on data received from the mobile computing device—that is, the "peripheral devices" referred to herein may include communication and computing capabilities, and may include, but extend to a broader range of devices than devices that have commonly been associated with the term.

FIG. 1 shows various zones of proximity to the peripheral device 104, including a first zone of proximity 110, a second zone of proximity 120, and a third zone of proximity 130, for example. In the present example, the zones of proximity 110, 120, and 130 represent a series of respectively smaller areas around the peripheral device 104, with the first zone of proximity 110 encompassing the second zone of proximity 120, and with the second zone of proximity 120 encompassing the third zone of proximity 130. In other words, the second and third zones are completely nested within the first zone, and the third zone is completely nested within the first and second zones. The first zone of proximity 110, for example, can represent a communication range of the peripheral device 104. When the mobile computing device 102 (here shown as device 102*a*) is within the first zone of proximity 110, for example, a user of the device 102*a* may generally be able to visually locate the peripheral device 104. The second zone of proximity 120, for example, can represent a potential physical contact range of the peripheral device 104. When the mobile computing device 102 (here shown as device 102*b*) is within the second zone of proximity 120, for example, a user of the device 102*b* may be within physical range (e.g., within arm's reach) of the peripheral device 104, such that the user may physically contact the device 104 if he so chooses. The third zone of proximity 130, for example, can represent an actual physical contact range (or near physical contact, such as being within several inches or centimeters) of the peripheral device 104. When the mobile computing device 102 (here shown as device 102*c*) is within the third zone of proximity 130, for example, a user of the device 102*c* may generally be causing physical contact (or near physical contact) between the device 102*c* and the peripheral device 104, such as by touching the device 102*c* to the device 104, or hovering the device 102*c* over the peripheral device 104 (e.g., within a few centimeters of the peripheral device 104).

Figure 2:
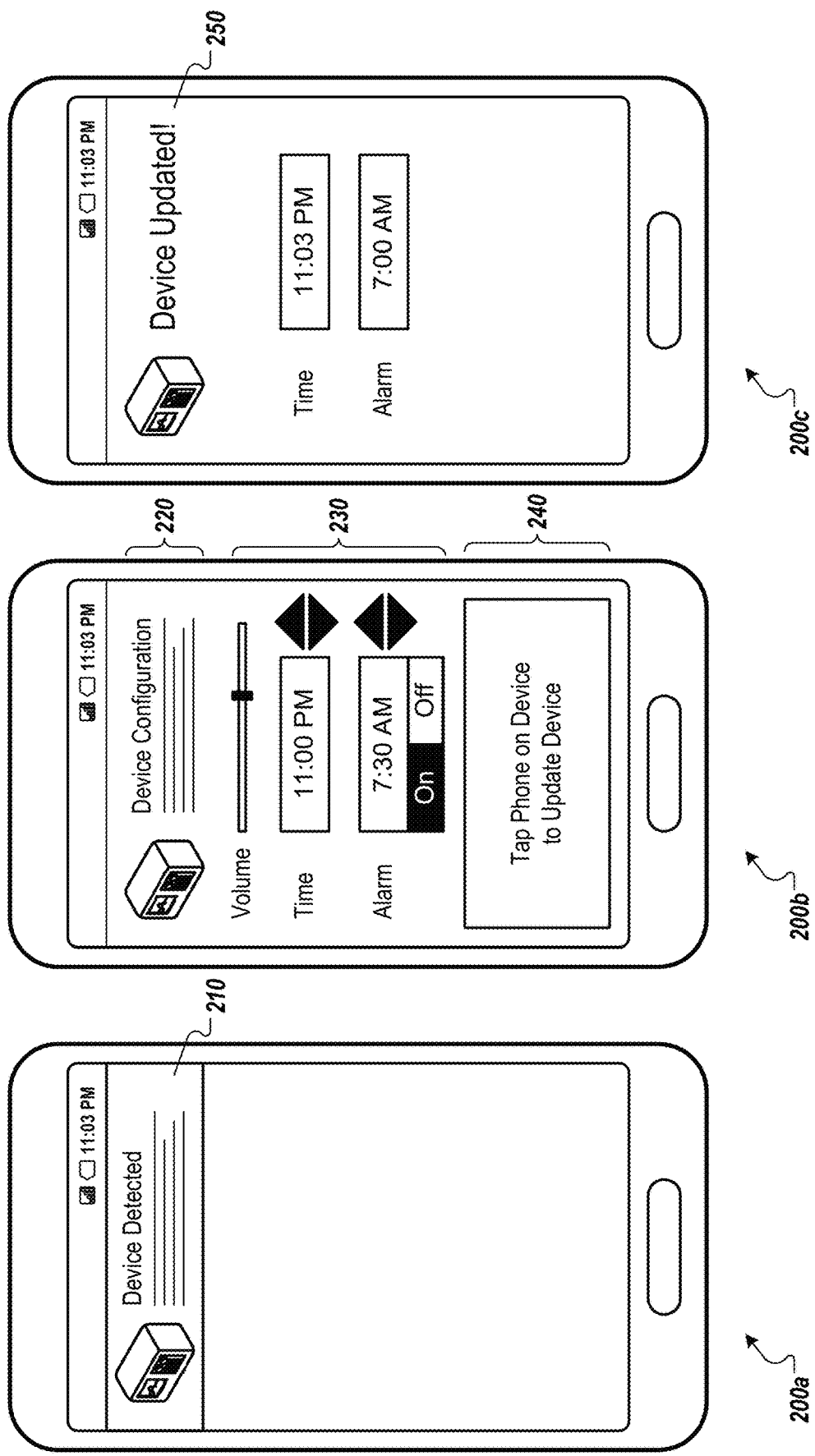
FIG. 2 shows example user interfaces that enable user interaction between a mobile computing device and a peripheral device, with the type of interface being presented by the mobile computing device based on its proximity to the peripheral device.

In general, each of the zones of proximity 110, 120, and 130 may be associated with a different type of interaction between the mobile computing device 102 and the peripheral device 104, and/or a different user interface may be presented by the mobile computing device 102 while the mobile computing device 102 is located in the zones. For example, when the mobile computing device 102 (here shown as device 102*a*) enters the first zone of proximity 110, the device 102*a* may receive a communication from the peripheral device 104, may determine that the device 104 is a type of device with which the device 102*a* may interact, and may present interface 200*a* (shown in FIG. 2). When the mobile computing device 102 (here shown as device 102*b*) enters the second zone of proximity 120, for example, the device 102*b* may present a different interface 200*b* (shown in FIG. 2) through which a user of the device 102*b* may configure the peripheral device 104. When the mobile computing device 102 (here shown as device 102*c*) enters the third zone of proximity 130, for example, the device 102 (here shown as device 102*c*) may perform a default action with respect to the peripheral device 104 and/or may present a different interface 200*c* (shown in FIG. 2) that confirms a update of the peripheral device 104.

In some implementations, a mobile computing device may communicate with a proxy peripheral device, rather than communicating directly with a peripheral device. For example, the peripheral device 104 may be physically inaccessible to a user of the mobile computing device 102 (e.g., the peripheral device 104 may be a hidden network router, may be a raised television, or may be another physically inaccessible device). Proxy peripheral device 106, for example, may be a physically accessible object (e.g., a router beacon, a television remote control, or another sort of proxy device) that may be paired with the peripheral device 104, and that handles communications with mobile computing devices instead of (or in addition to) the peripheral device 104 directly handling such communications. In the present example, the proxy peripheral device 106 can have its own one or more proxy zones of proximity 140 (e.g., including its own first, second, and third zones of proximity). The proxy peripheral device 106, for example, can communicate with both the peripheral device 104 and with the mobile computing device 102, rather than the mobile computing device 102 communicating directly with the peripheral device 104. In general, the proxy peripheral device 106 may be located within the first zone of proximity 110 or within the second zone of proximity 120 of the peripheral device 104.

Figure 3A:
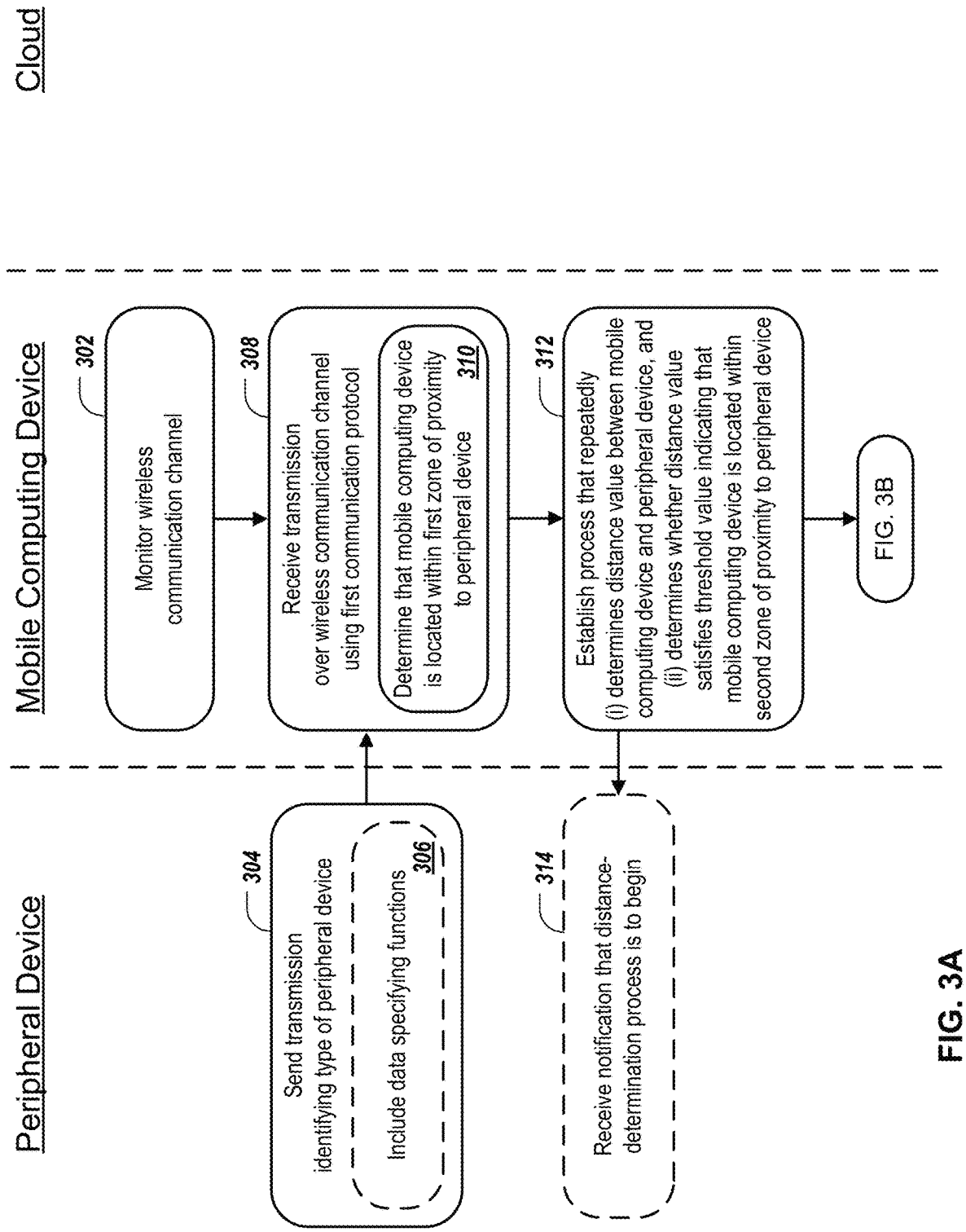
Figure 3B:
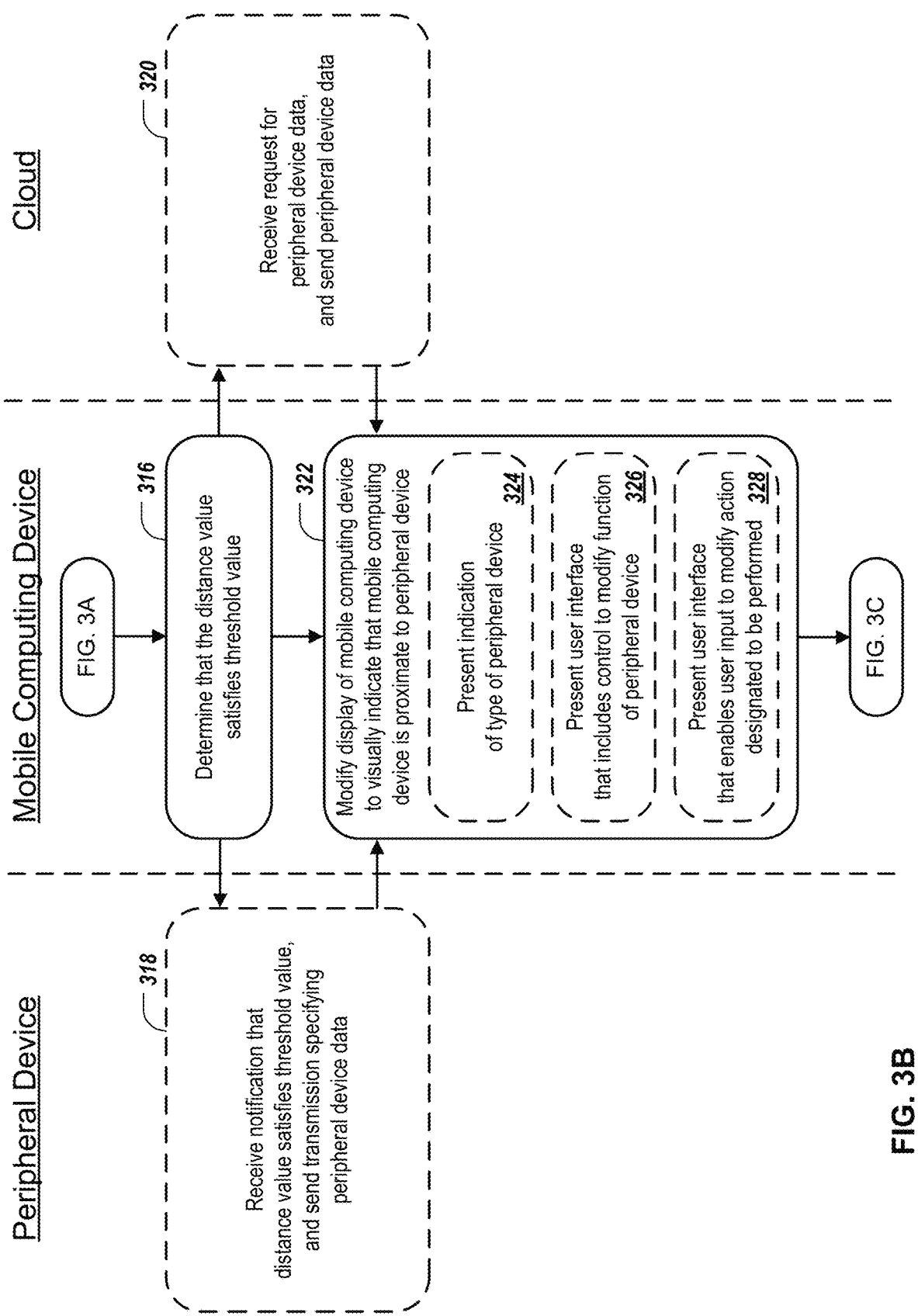

Referring now to FIGS. 3A-C, a diagram is shown of an example process for modifying a type of interaction between a mobile computing device and a peripheral device based on proximity. Operations for modifying the type of interaction may be performed by the system 100 (shown in FIG. 1), for example, and may include presenting one or more user interfaces, such as the user interfaces 200*a*, 200*b*, and/or 200*c* (shown in FIG. 2). However, the operations may also be performed by different systems and/or may include presenting different sorts of user interfaces (or no user interfaces).

At box 302, a mobile computing device monitors a wireless communication channel. For example, the mobile computing device 102 (shown in FIG. 1 as device 102*a*) can monitor a wireless communication channel that various different peripheral devices may use for broadcasting transmissions which may be received by mobile computing devices. The mobile computing device 102, for example, can run an operating system which includes a listener application that listens for transmissions broadcasted by peripheral devices, and which includes an application programming interface (API) that specifies a format for data transmitted by peripheral devices. A peripheral device provider (e.g., a manufacturer and/or software developer) may choose to configure its peripheral device to broadcast transmissions using the wireless communication channel according to the API, for example, such that various different mobile computing devices (e.g., mobile computing device 102) can parse and use data included in the transmissions, without necessarily pairing the mobile computing devices with the peripheral device. In general, the listener application can use low-power techniques for monitoring the wireless communication channel. For example, the mobile computing device 102 can periodically (e.g., once per minute, twice per minute, four times per minute, ten times a minute, twenty times a minute, or at another suitable interval) monitor the wireless communication channel for transmissions from peripheral devices, such that device battery power is conserved.

At box 304, a peripheral device sends a transmission over the wireless communication channel using a first communication protocol. For example, the peripheral device 104 can broadcast a transmission that includes data formatted according to the API of the mobile computing device 102. The transmission can identify a type of peripheral device. For example, the transmission broadcast by the peripheral device 104 can include one or more data values that identify the device 104 as being a particular type of device (e.g., a data value that corresponds to the device type, such as a general category of devices), a particular model of the device type (e.g., a model identifier), and/or a particular device (e.g., a serial number). In the present example, the transmission broadcast by the peripheral device 104 identifies the device as being an alarm clock. The peripheral device may regularly send such transmissions and may not address such transmissions to any particular device (e.g., such that the transmissions are considered "broadcasts" to any device listening for such broadcasts).

At box 306, the transmission may optionally include data that specifies one or more functions of the peripheral device. For example, the transmission broadcast by the peripheral device 104 can include one or more data values that specify functions and/or settings of the device 104 that can be triggered and/or modified by the mobile computing device 102. In the present example, the mobile computing device 102 (e.g., an alarm clock) can broadcast data specifying that its volume may be modified, its clock time may be set, its alarm time may be set, and the alarm may be toggled on or off.

In some implementations, the first communication protocol can include a Bluetooth Low Energy (BLE) communication protocol. For example, the peripheral device 104 can use the BLE communication protocol to communicate asynchronously with one or more mobile computing devices that are within communication range of the device 104. Asynchronous communication may be accomplished using a data publishing model in which the peripheral device 104, for example, does not specifically pair with the mobile computing device 102, but rather broadcasts data that can be read by the mobile computing device 102. In some implementations, the first communication protocol can include another technique for asynchronously broadcasting data, such as using Wi-Fi signals, infrared signals, high-frequency sounds, or other suitable techniques.

At box 308, the mobile computing device receives the transmission over the wireless communication channel using the first communication protocol. For example, the mobile computing device 102 (shown in FIG. 1 as device 102a) can receive one or more transmissions broadcast by the peripheral device 104 while periodically monitoring for such transmissions.

At box 310, the mobile computing device can determine that the mobile computing device is located within a first zone of proximity to the peripheral device, based on receipt of the transmission. For example, the mobile computing device 102 (shown in FIG. 1 as device 102a) can determine that it is located within the first zone of proximity 110 to the peripheral device 104. The first zone of proximity 110, for example, can correspond to a communication range in which the mobile computing device 102 can receive data broadcast by the peripheral device 104. The mobile computing device 102 determining that it is within the first zone of proximity 110 may involve the mobile computing device 102 taking actions responsive to receiving the transmission, and does not necessarily require the mobile computing device 102 to perform operations specifically flagged for performances when within a particular "zone."

In some implementations, a mobile computing device may modify a display of the mobile computing device to visually indicate that the mobile computing device is proximate to a peripheral device, in response to determining that the mobile computing device is located within the first zone of proximity to the peripheral device. For example, mobile computing device 102a may modify its display to present the interface 200a (shown in FIG. 2), which can include a notification 210 indicating that a configurable peripheral device (e.g., peripheral device 104) has been detected nearby, along with information corresponding to one or more data values broadcast by the device 104 (e.g., device type, model identifier, serial number, and/or other identifying information). For example, the mobile computing device 102a can present the identifying information broadcast by the peripheral device 104, and/or can use the identifying information to reference additional information about the device 104 that is stored locally by the mobile computing device 102a, or is available from a server on the cloud. In the present example, the mobile computing device 102a selects a suitable image to represent the peripheral device 104 based on the information broadcast by the device 104 (e.g., device model information), and includes the selected image in the notification 210. Based on the notification 210, for example, a user of the mobile computing device 102a can identify the peripheral device 104, and can move toward the device 104 to establish further communication with (and to potentially configure) the device 104.

In some implementations, a mobile computing device may not modify a display of the mobile computing device to visually indicate that the mobile computing device is proximate to a peripheral device, in response to determining that the mobile computing device is located within the first zone of proximity to the peripheral device. For example, when the mobile computing device 102 is proximate to multiple different peripheral devices, and/or when the mobile computing device 102 frequently enters first zones of proximity to such devices, notifications of peripheral device detections may be suppressed by the device 102, such that a user of the device 102 is not presented with too many (or too frequent) notifications.

At box 312, in response to the mobile computing device receiving the transmission from the peripheral device, the mobile computing device can establish a distance-determination process that repeatedly: (i) determines a distance value between the mobile computing device and the peripheral device, and (ii) determines whether the distance value satisfies a threshold value indicating that the mobile computing device is located within a second zone of proximity to the peripheral device. For example, while the mobile computing device 102 (shown in FIG. 1 as device 102a) is in the first zone of proximity 110 (e.g., within communication range of the peripheral device 104 based on the wireless communication channel using the first communication protocol), the mobile computing device 102 can perform the distance-determination process to determine when the device 102 has entered the second zone of proximity 120. The second zone of proximity 120, for example, can correspond to a threshold distance to the peripheral device 104 at which a user of the mobile computing device 102 (shown in FIG. 1 as device 102b) could potentially cause physical contact between the devices, such as a distance of three feet, four feet, five feet, or another suitable value.

In some implementations, repeatedly determining the distance between the mobile computing device and the peripheral device may not include communicating over the wireless communication channel. For example, the mobile computing device 102 can use a technique that is different than communicating over the wireless communication channel using the first communication protocol to determine the distance, such as one or more of measuring a communication signal strength (e.g., Bluetooth signal strength, Wi-Fi signal strength, ultrasound intensity, or another type of communication signal), performing time-of-flight analysis techniques for one or more received signals, or performing another suitable technique. In general, a distance-determination process performed while the mobile computing device 102 (shown in FIG. 1 as device 102a) is within the first zone of proximity 110 may be performed more frequently than a rate at which the wireless communication channel is monitored for transmissions from peripheral devices. For example, the mobile computing device 102 can monitor the wireless communication channel (using the first communication protocol) for transmissions from peripheral devices at a given rate (e.g., once per minute, twice per minute, four times per minute, or at another suitable interval), and when the mobile computing device 102 (shown in FIG. 1 as device 102a) enters the first zone of proximity 110, the device 102a can perform the distance-determination process at a more frequent rate (e.g., once per second, twice per second, every other second, or at another suitable interval).

At box 314, establishing the distance-determination process may optionally include the mobile computing device sending a response to the transmission from the peripheral device over the same wireless communication channel using the first communication protocol, and the peripheral device receiving the response as a notification that the distance-determination process is to begin. For example, the mobile computing device 102a can notify the peripheral device 104 that the distance-determination process is to begin, and in response, the peripheral device 104 can either transmit or listen to transmissions on one or more different radio frequency channels (e.g., Bluetooth, Wi-Fi, or another suitable communication channel) as part of performing the distance-determination process.

In some implementations, a communication channel may be set up between a mobile computing device and a peripheral device on a different radio frequency channel using sockets. In general, establishing a communication channel using sockets can take time. By initiating a process for establishing the communication channel with the peripheral device 104 when the mobile computing device 102 enters the first zone of proximity 110, for example, the channel may be established by a time when the device 102 enters the second zone of proximity 120, such that a user of the device 102 does not experience lag when using the device 102 to control the peripheral device 104 (e.g., the user interface 200b is immediately presentable upon device 102 determining that it is within the second zone of proximity). Setting up a communication channel using sockets may be beneficial, for example, when complex communications are to occur between the mobile computing device 102 and the peripheral device 104, and/or when large amounts of data are to be communicated between the devices.

In some implementations, a communication channel may not be set up between a mobile computing device and a peripheral device on a different radio frequency using sockets. For example, the mobile computing device 102 and the peripheral device 104 can each continue to communicate asynchronously by broadcasting data that may be received by the other device. Not setting up a communication channel using sockets may be beneficial, for example, when simple communications are to occur between the mobile computing device 102 and the peripheral device 104, and/or when small amounts of data are to be communicated between the devices.

At box 316, after the mobile computing device has determined that the distance value does not satisfy the threshold value, the mobile computing device can determine that the distance value does satisfy the threshold value. For example, while the mobile computing device 102 (shown in FIG. 1 as device 102a) is within the first zone of proximity 110 but has not yet entered the second zone of proximity 120, the mobile computing device 102 can repeatedly determine a distance value that corresponds to its distance to the peripheral device 104, and can determine, based on the distance value not satisfying the threshold value, that the device 102 has not yet entered the second zone of proximity 120. When the mobile computing device 102 (shown in FIG. 1 as device 102b) enters the second zone of proximity 120, for example, the device 102 can determine that it is now within the second zone of proximity 120, based on its distance value satisfying the zone's corresponding distance threshold value (e.g., three feet, four feet, five feet, or another suitable value that may be determined based on signal strength).

At box 318, in response to determining that the distance value satisfies the threshold value, the mobile computing device may optionally send a notification to the peripheral computing device that the distance value satisfies the threshold value. For example, when the mobile computing device 102 (shown in FIG. 1 as device 102b) enters the second zone of proximity 120, the device 102b may broadcast the notification to the peripheral computing device 104 over the wireless communication channel using the first communication protocol, or may send the notification to the peripheral computing device 104 using the different communication channel that has been set up between the devices. The peripheral device 104 may receive the notification that the distance value satisfies the threshold value, and in response, may send a transmission that specifies data related to the peripheral device 104 (e.g., by broadcasting the transmission over the wireless communication channel using the first communication protocol, or by sending the transmission using the different communication channel that has been set up between the devices), which may be received by the mobile computing device 102b. For example, the data related to the peripheral device 104 may include one or more data values that specify functions and/or settings of the device 104 that can be triggered and/or modified by the mobile computing device 102b, and/or may include instructions for presenting such data values in an interface to be presented by the device 102b.

In some implementations, data related to a peripheral device and provided to a mobile computing device may be adapted by the peripheral device for the mobile computing device based on one or more aspects of the mobile computing device. For example, the peripheral device 104 can receive, along with the notification that the distance value satisfies the threshold value, one or more data values from the mobile computing device 102 that correspond to aspects of the device 102 that may potentially pertain to the peripheral device 104, and the peripheral device 104 can modify data to be presented in an interface by the device 102, based on the one or more data values from the device 102. In the present example, data values from the mobile computing device 102 can include a data value that specifies a particular aspect of the device 102 that potentially pertains to the peripheral device 104 (e.g., that an alarm is set on the device 102). The peripheral device 104, for example, can receive the data value that specifies the particular aspect of the mobile computing device 102, and in response, can provide data to the device 102 that causes the device 102 to present an interface that includes an option that corresponds to the particular aspect of the device 102 (e.g., to send the alarm to the peripheral device 104). If data values from the mobile computing device 102 had not included the data value that specifies that the alarm is set on the device 102, for example, the peripheral device 104 may not provide data to the device 102 that causes the device 102 to present the interface that includes the option to send the alarm to the peripheral device 104.

At box 320, in response to determining that the distance value satisfies the threshold value, the mobile computing device may optionally send a request to the cloud for data related to the peripheral device, and may in response receive the peripheral device data. For example, the mobile computing device 102 can provide an identifier of the peripheral device 104 to a cloud service that in return provides general information related to the peripheral device 104 (e.g., one or more images, descriptions, and so forth), and/or provides data that can be used by the mobile computing device 102 for rendering an interface for configuring the peripheral device 104.

At box 322, in response to determining that the distance value satisfies the threshold value, the mobile computing device can modify a display of the mobile computing device to visually indicate that the mobile computing device is proximate to the peripheral device. For example, when the mobile computing device 102 (shown in FIG. 1 as device 102*b*) enters the second zone of proximity 120, the device 102*b* can modify its display to visually indicate that the device 102*b* is proximate (e.g., within three feet, four feet, five feet, or another suitable distance) to the peripheral device 104. In the present example, the mobile computing device 102*b* can visually indicate that the device 102*b* is proximate to the peripheral device 104 by presenting interface 200*b* (shown in FIG. 2). In some examples, the mobile computing device 102*b* may present a notification similar to the notification 210 shown in user interface 200*a* upon the mobile computing device 102*b* determining that it is within the second zone of proximity 120, and after user selection of the notification 210 the mobile computing device 102*b* may present the user interface 200*b* that presents additional controls. In such examples, the mobile computing device 102*b* may or may not present the notification 210 previously when the mobile computing device 102*b* was in the first zone of proximity 110.

At box 324, modifying the display of the mobile computing device to visually indicate that the mobile computing device is proximate to the peripheral device may optionally include presenting an indication of the type of the peripheral device on the display of the mobile computing device without the mobile computing device receiving user input after receiving the transmission from the peripheral device. For example, without receiving user input after receiving the transmission from the peripheral device 104, the mobile computing device 102*b* can present the interface 200*b* (shown in FIG. 2). In the present example, the interface 200*b* includes a visual indication 220 that includes an image of the peripheral device 104, a device description (e.g., including a device type, a model identifier, and/or a serial number), and a message indicating that the device is configurable.

At box 326, modifying the display of the mobile computing device to visually indicate that the mobile computing device is proximate to the peripheral device may optionally include presenting a user interface that includes a control to modify a function of the peripheral device. For example, the mobile computing device 102*b* can present the interface 200*b* (shown in FIG. 2). In the present example, the interface 200*b* includes various controls 230 to modify various functions of the peripheral device 104 (e.g., an alarm clock), including a control to modify a volume setting of the device 104, a control to modify a clock time setting of the device 104, a control to modify an alarm time setting of the device 104, and a control to toggle an alarm set on the device 104 on or off.

In some implementations, the mobile computing device may select one or more controls to modify the function of the peripheral device for inclusion in the user interface from among multiple controls available for inclusion in the user interface, based on the transmission having specified the function. For example, the mobile computing device 102*b* can select the controls 230 in the interface 200*b* to modify functions of the peripheral device 104, based on the received transmission. In general, mobile computing devices that support an API for communicating with and controlling peripheral devices may include a template mechanism for rendering user interfaces. For example, a vast range of peripheral devices may exist, with potentially many different functions. Rather than providing large amounts of data for rendering custom-designed user interfaces for configuring a peripheral device, the peripheral device may send minimal data specifying available functions and corresponding setting values, for example, and mobile computing devices that receive the data (e.g., controller devices) may use the template mechanism to render user interfaces using common components (e.g., controls) that support the available functions.

In the present example, the transmission from the peripheral device 104 to the mobile computing device 102 (e.g., the transmission that was received by the mobile computing device 102*a* after the device 102*a* had entered the first zone of proximity 110 but had not yet entered the second zone of proximity 120) can include data that specifies that the peripheral device 104 supports a volume function, a clock time function, an alarm time function, and an alarm toggle function. Using the template mechanism, for example, the mobile computing device 102*b* can select appropriate corresponding controls 230 to modify the specified functions of the peripheral device 104 for inclusion in the user interface 200*b*, and can populate the controls 230 with current data values received from the peripheral device 104.

At box 328, modifying the display of the mobile computing device to visually indicate that the mobile computing device is proximate to the peripheral device may optionally include presenting a user interface that enables user input to modify an action designated to be performed in response to the mobile computing device determining that the mobile computing device is located within a third zone of proximity to the peripheral device. For example, the mobile computing device 102*b* can present the user interface 200*b* that enables user input through the controls 230 to modify an action designated to be performed in response to the device 102 (shown in FIG. 1 as device 102*c*) determining that the device 102c is located within the third zone of proximity 130 to the peripheral device 104. The action, for example, may include using values specified through the user interface 200b to modify one or more functions the peripheral device 104. As another example, the action may include performing a default action that may be specified by a peripheral device, such as applying an alarm set on the mobile computing device 102 to the peripheral device 104, or performing another appropriate action. In the present example, the user interface 200b includes a message 240 (e.g., "Tap phone on device to update device.") that informs a user of the mobile computing device 102b of the default action to be performed.

At box 330, the mobile computing device optionally receives user input that interacts with a control to modify a function of the peripheral device. For example, the mobile computing device 102 (shown in FIG. 1 as device 102b) can receive user input provided through the controls 230 of the user interface 200b. In the present example, a user can manipulate the controls 230 to indicate that a volume of the peripheral device 104 (e.g., an alarm clock) is to be changed, that a clock time of the device 104 is to be changed, that an alarm time of the device is to be changed, and/or that the alarm is to be set on the device.

At box 332, the mobile computing device optionally sends a signal for receipt by the peripheral device that specifies the modification to the function that was specified by the user input that interacted with the control. For example, the mobile computing device 102 (shown in FIG. 1 as device 102b) can send the signal for receipt by the peripheral device 104 that specifies one or more modifications to functions specified by user input through one or more of the controls 230. The signal may be sent by the mobile computing device 102b, for example, by sending the signal over the wireless communication channel using the first communication protocol, or may be sent using the different communication channel that has been set up between the devices. In the present example, the mobile computing device 102b can send the signal for receipt by the peripheral device 104 without the device 102b entering the third zone of proximity 130.

At box 334, the peripheral device optionally receives the signal and modifies the function. For example, the peripheral device 104 can receive the signal and modify one or more functions of the device 104, based on the user input provided through one or more of the controls 230. In the present example, the peripheral device 104 (e.g., an alarm clock) may change its volume, change its clock time, change its alarm time, and/or may set an alarm.

At box 336, the peripheral device can send data using a second communication protocol, the second communication protocol having a shorter range than the first communication protocol. For example, after the mobile computing device 102 (shown in FIG. 1 as device 102b) enters the second zone of proximity 120 (e.g., when the device 102b is within a potential physical contact range, based on the distance-determination process), the peripheral device 104 can begin sending data using the second communication protocol (e.g., in response to receiving a notification from the mobile computing device 102b that the distance value satisfies the threshold value). In some implementations, the second communication protocol may include a Near Field Communication (NFC) protocol. For example, the peripheral device 104 can generate a radio frequency (RF) field that facilitates NFC peer-to-peer communications when the mobile computing device 102 (shown in FIG. 1 as device 102c) enters the third zone of proximity 130, and/or can power a passive NFC device included in the mobile computing device 102c.

In some implementations, a mobile computing device may initiate NFC transmissions for receipt by a peripheral device in response to the mobile computing device either (i) receiving the transmission from the peripheral device using the first communication protocol, or (ii) determining that the distance value satisfies the threshold value. For example, when the mobile computing device 102 (shown in FIG. 1 as device 102a) enters the first zone of proximity 110, the device 102a can initiate NFC transmissions for receipt by the peripheral device 104, in response to receiving the transmission from the peripheral device using the first communication protocol. As another example, when the mobile computing device 102 (shown in FIG. 1 as device 102b) enters the second zone of proximity 120, the device 102b can initiate NFC transmissions for receipt by the peripheral device 104, in response to determining that the device 102b is within a potential physical contact range of the peripheral device 104, based on the distance-determination process.

At box 338, after the mobile computing device has determined that the distance value satisfies the threshold value, and as a result of the mobile computing device receiving data from the peripheral device using the second communication protocol, the mobile computing device can determine that the mobile computing device is within a third zone of proximity to the peripheral device. As shown in FIG. 1, for example, the third zone of proximity 130 can be smaller than the second zone of proximity 120 and can be smaller than the first zone of proximity 110. After the mobile computing device 102 (shown in FIG. 1 as device 102b) determines that the device 102b is within a potential physical contact range of the peripheral device 104 (e.g., based on the distance-determination process), and as a result of the mobile computing device 102 (shown in FIG. 1 as device 102c) receiving data from the peripheral device 104 using the second communication protocol (e.g., a NFC communication), the mobile computing device 102c can determine that the device 102c is within the third zone of proximity 130 to the peripheral device 104.

In some implementations, determining that a mobile computing device is within a third zone of proximity to a peripheral device may include determining that the mobile computing device is proximate to the peripheral device, without physically contacting the peripheral device. For example, when the mobile computing device 102 (shown in FIG. as device 102c) is within a communication range of the peripheral device 104 using the second communication protocol (e.g. a NFC communication range of several inches or centimeters), but not physically contacting the peripheral device 104, the mobile computing device 102c can receive data from the peripheral device 104 (e.g., using NFC communication). In some implementations, the mobile computing device 102 may determine that it is within the third zone of proximity 130 using the distance-determination techniques previously discussed for determining whether the mobile computing device 102 is within the second zone of proximity 120, but based on the distance-determination techniques determining that the mobile computing device 102 is within an even closer threshold distance than that used to determine presence within the second zone of proximity 120.

In some implementations, determining that a mobile computing device is within a third zone of proximity to a peripheral device may include determining that the mobile computing device is physically contacting the peripheral device. For example, when the mobile computing device 102 (shown in FIG. 1 as device 102c) is within a communication range of the peripheral device 104 using the second communication protocol (e.g., a NFC communication range of several inches or centimeters), the mobile computing device 102c and/or the peripheral device 104 can use motion sensors to determine when physical contact has occurred between the devices.

At box 340, the mobile computing device can perform an action in response to determining that the mobile computing device is located within the third zone of proximity to the peripheral device. For example, the mobile computing device 102 (shown in FIG. 1 as device 102c) can determine that it is located within the third zone of proximity 130 to the peripheral device 104, and can perform one or more actions (e.g., broadcasting data to be received by one or more devices, transmitting data to a particular peripheral device, sending data to and/or receiving data from a cloud server, updating local settings, executing an application, or another appropriate action) in response to the determining.

In some implementations, performing an action may include performing the action without the mobile computing device receiving user input (excluding physical movement of the mobile computing device as a form of user input) after receiving the transmission from the peripheral device. For example, after the mobile computing device 102 (shown in FIG. 1 as device 102a) has determined that it has entered the first zone of proximity 110 based on receiving the transmission from the peripheral device 104 over the wireless communication channel using the first communication protocol, the mobile computing device 102 may continue to move toward the peripheral device 104, through the second zone of proximity 120, and into the third zone of proximity 130, without receiving user input. When the mobile computing device 102 (shown in FIG. 1 as device 102c) enters the third zone of proximity 130 (e.g., by hovering over the peripheral device 104 and/or physically contacting the device 104), for example, the mobile computing device 102c may perform a default action (e.g., an action that was described in the message 240 presented by the interface 200b, when the device 102 was in the second zone of proximity 120) with respect to the peripheral device 104. In the present example, the mobile computing device 102c may update the peripheral device 104 with time and/or alarm settings of the mobile computing device 102c, without the device 102c receiving user input. After updating the peripheral device 104, for example, the mobile computing device 102c may provide the interface 200c that confirms the update of the peripheral device 104, including a message 250 that may include a status notification related to the updating (e.g., "Device Updated!") and/or one or more updated values for settings of the peripheral device 104 (e.g., Time: 11:03 PM; Alarm: 7:00 AM).

In some implementations, performing an action may include the mobile computing device sending a request that the peripheral device perform the action. For example, the mobile computing device 102 (shown in FIG. 1 as device 102c) can send a request to the peripheral device 104 that the device 104 perform the action (e.g., using values specified through the user interface 200b, or performing a default action). Sending the request, for example, may include the mobile computing device 102c sending a signal over the wireless communication channel using the first communication protocol. As another example, sending the request may include the mobile computing device 102c using the different communication channel that has been set up between the device 102 and the peripheral device 104. As another example, sending the request may include the mobile computing device 102c using the second communication protocol having a shorter range than the first communication protocol.

In some implementations, the peripheral device may be a proxy peripheral device for another peripheral device, and performing an action may include the mobile computing device sending a request that the other peripheral device perform the action. For example, the mobile computing device 102 may enter the proxy zone of proximity 140 of the proxy peripheral device 106 for the peripheral device 104, and in response, the mobile computing device 102 may send a request that the peripheral device 104 perform the action. The request, for example, may be sent directly by the mobile computing device 102 to the peripheral device 104, or may be sent by the mobile computing device 102 to the proxy peripheral device 106, for forwarding by the proxy peripheral device 106 to the peripheral device 104.

The mobile computing device 102 may continue to perform the distance determination process while the mobile computing device 102 is in the second or third zones of proximity, to identify when the mobile computing device 102 has left the second and/or third zones of proximity and falls only within the first zone of proximity. Similarly, the mobile computing device 102 may perform actions to determine when it leaves the first zone of proximity (e.g., due to the mobile computing device 102 no longer receiving broadcasts from the peripheral device), and may update its user interface and operations accordingly to correspond to those discussed throughout this document.

Figure 4:
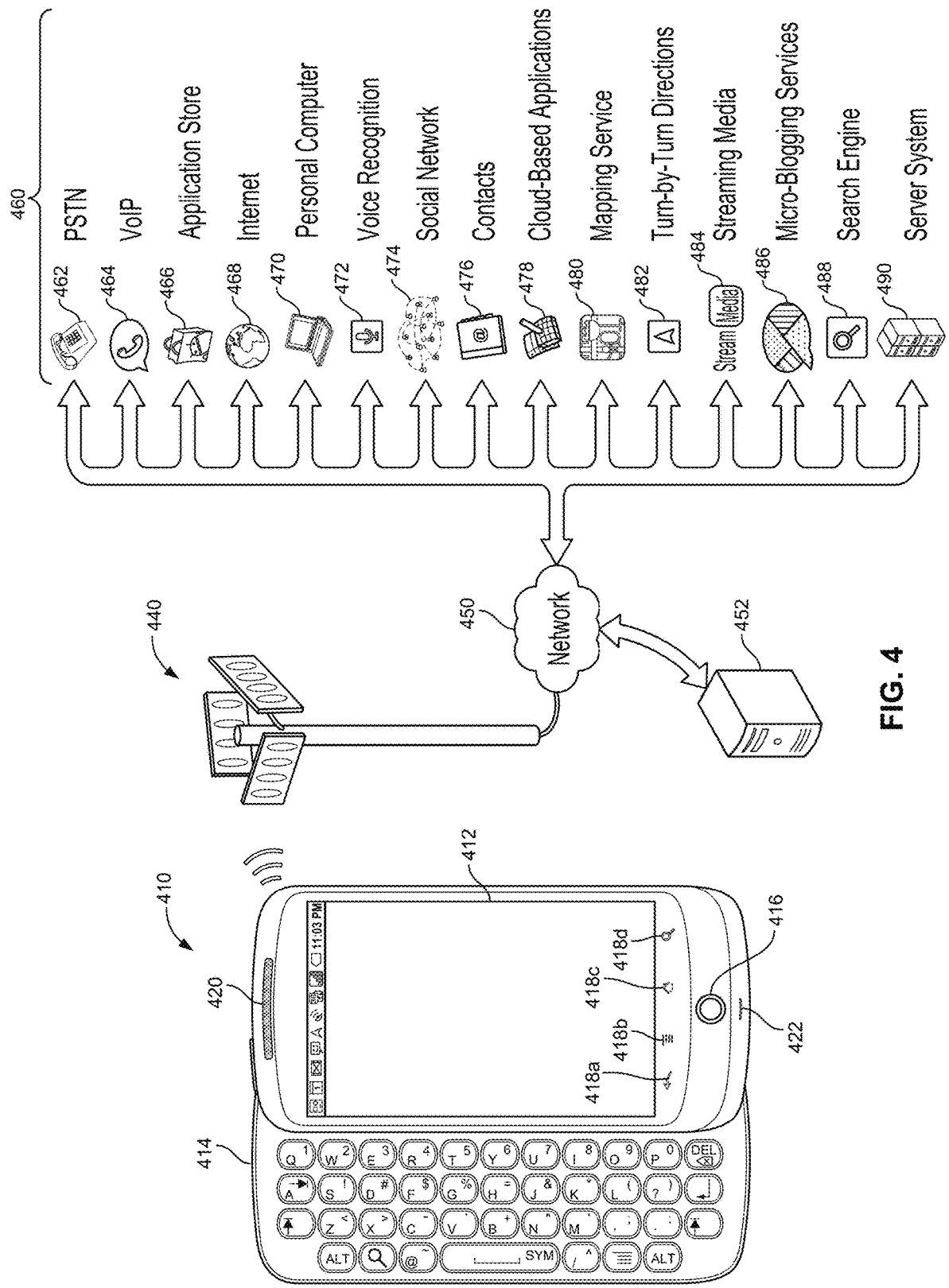
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VOIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VOIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service

486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
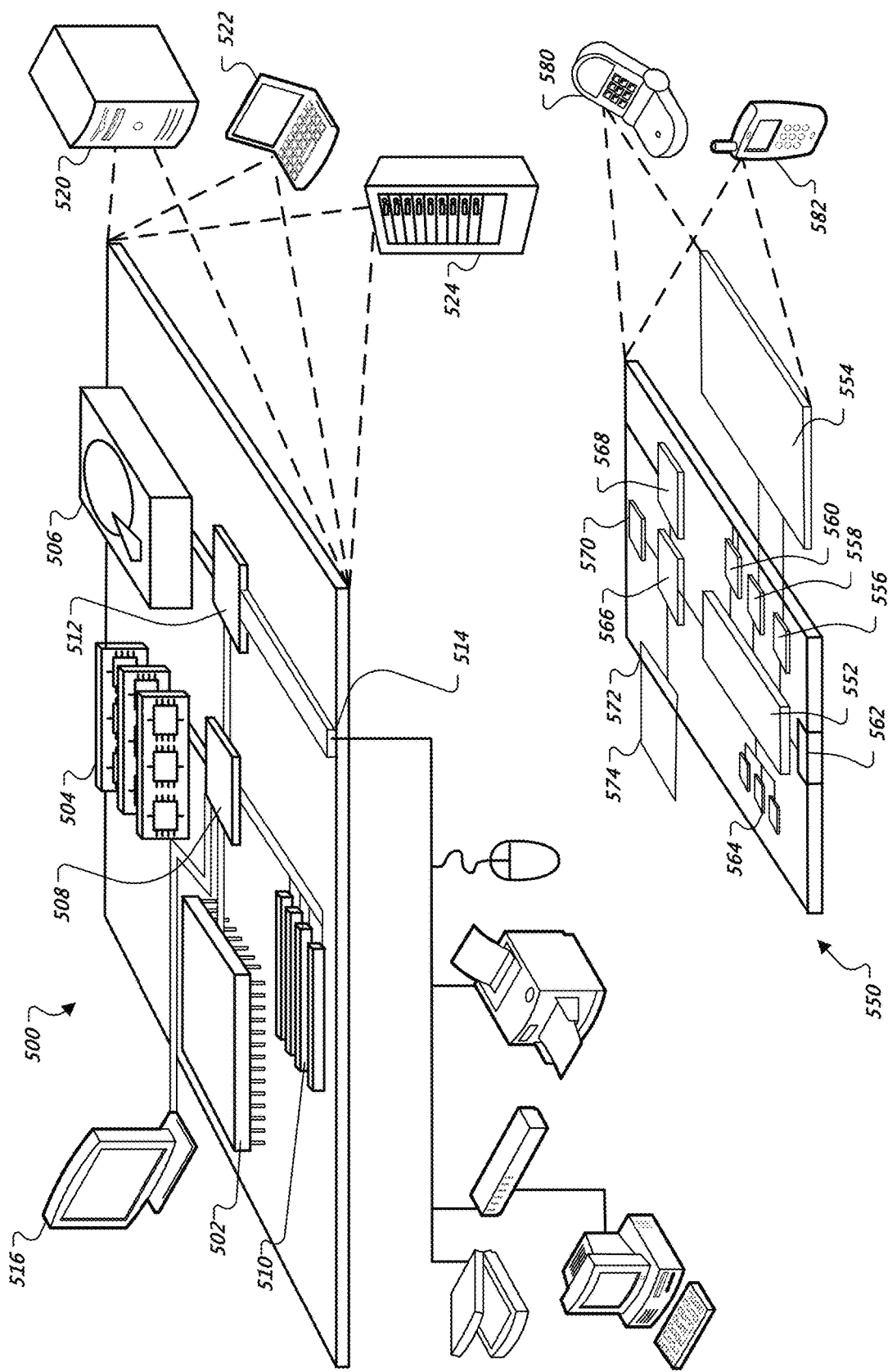
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506.

Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for transferring audio playback from a mobile computing device to a peripheral device, the method comprising:
    receiving, by the mobile computing device, a request for the mobile computing device to perform the audio playback;
    monitoring, by the mobile computing device, a wireless communication channel;
    receiving, by the mobile computing device, a transmission from the peripheral device over the wireless communication channel using a first communication protocol, the transmission identifying the peripheral device, receipt of the transmission indicating that the mobile computing device is located within a first zone of proximity to the peripheral device;
    determining, by the mobile computing device and based on the wireless communication channel, whether the mobile computing device is within a second zone of proximity to the peripheral device, the second zone of proximity being smaller than the first zone of proximity, and wherein the second zone of proximity is associated with a distance indicative of near physical contact between the mobile computing device and the peripheral device;
    responsive to receiving the transmission from the peripheral device using the first communication protocol and determining the mobile computing device is within the second zone of proximity:
        initiating, by the mobile computing device, a second communication protocol that has a shorter range than the first communication protocol; and
        modifying, by the mobile computing device, a display of the mobile computing device to visually indicate that the mobile computing device is within the second zone of proximity to the peripheral device;
    responsive to receiving data from the peripheral device using the second communication protocol, determining, by the mobile computing device, that the mobile computing device is located within a third zone of proximity to the peripheral device, the third zone of proximity being smaller than the second zone of proximity, and wherein the third zone of proximity is associated with a distance indicative of physical contact between the mobile computing device and the peripheral device;
    responsive to determining that the mobile computing device is located within the third zone of proximity to the peripheral device, transferring, by the mobile computing device, the audio playback from the mobile computing device to the peripheral device; and
    receiving, by the mobile computing device, user input that interacts with a control to modify the audio playback by the peripheral device.

2. The computer-implemented method of claim 1, wherein determining that the mobile computing device is within the second zone of proximity to the peripheral device comprises measuring a signal strength of the transmission from the peripheral device.

3. The computer-implemented method of claim 1, wherein modifying the display of the mobile computing device to visually indicate that the mobile computing device is within the second zone of proximity to the peripheral device includes presenting an indication of a type of the peripheral device on the display of the mobile computing device.

4. The computer-implemented method of claim 3, wherein the indication of the type of the peripheral device is presented without the mobile computing device receiving user input after receiving the transmission from the peripheral device.

5. The computer-implemented method of claim 1, wherein transferring the audio playback from the mobile computing device to the peripheral device includes sending, by the mobile computing device, a signal to the peripheral device that specifies an audio playback request.

6. The computer-implemented method of claim 5, wherein the signal is sent using the second communication protocol.

7. The computer-implemented method of claim 1, further comprising:
    sending, by the mobile computing device and to the peripheral device, a signal that specifies a modification to the audio playback that was specified by the user input that interacted with the control.

8. The computer-implemented method of claim 1, wherein the mobile computing device initiates Near Field Communication transmissions for receipt by the peripheral device in response to the mobile computing device either (i) receiving the transmission from the peripheral device using the first communication protocol, or (ii) determining that a distance value satisfies a threshold value.

9. A mobile computing device comprising:
    two or more wireless communication interfaces, wherein a first wireless communication interface from the two or more wireless communication interfaces operates in accordance with a first communication protocol, and wherein a second wireless communication interface from the two or more wireless communication interfaces operates in accordance with a second communication protocol;
a display that displays a graphical user interface;
one or more processors; and
one or more computer-readable devices that store instructions, wherein the instructions, when executed by the one or more processors, cause the one or more processors to:
receive a request for the mobile computing device to perform audio playback;
monitor, using the first wireless communication interface, a wireless communication channel;
receive a transmission from a peripheral device over the wireless communication channel using the first communication protocol, the transmission identifying the peripheral device, receipt of the transmission indicating that the mobile computing device is located within a first zone of proximity to the peripheral device;
determine, based on the wireless communication channel, whether the mobile computing device is within a second zone of proximity to the peripheral device, the second zone of proximity being smaller than the first zone of proximity, and wherein the second zone of proximity is associated with a distance indicative of near physical contact between the mobile computing device and the peripheral device;
responsive to receiving the transmission from the peripheral device using the first communication protocol and determining the mobile computing device is within the second zone of proximity:
initiate the second communication protocol, wherein the second communication protocol has a shorter range than the first communication protocol; and
modify the graphical user interface to visually indicate that the mobile computing device is within the second zone of proximity to the peripheral device;
responsive to receiving data from the peripheral device using the second communication protocol, determine that the mobile computing device is located within a third zone of proximity to the peripheral device, the third zone of proximity being smaller than the second zone of proximity, and wherein the third zone of proximity is associated with a distance indicative of physical contact between the mobile computing device and the peripheral device;
responsive to determining that the mobile computing device is located within the third zone of proximity to the peripheral device, transfer the audio playback from the mobile computing device to the peripheral device; and
receive user input that interacts with a control to modify the audio playback by the peripheral device.

10. The mobile computing device of claim 9, wherein the instructions cause the one or more processors to determine that the mobile computing device is within the second zone of proximity to the peripheral device by at least causing the one or more processors to measure a signal strength of the transmission from the peripheral device.

11. The mobile computing device of claim 9, wherein the instructions cause the one or more processors to modify the display of the mobile computing device to visually indicate that the mobile computing device is within the second zone of proximity to the peripheral device by at least causing the one or more processors to modify the graphical user interface to include an indication of a type of the peripheral device on the display of the mobile computing device.

12. The mobile computing device of claim 11, wherein the indication of the type of the peripheral device is included within the graphical user interface without the mobile computing device receiving user input after receiving the transmission from the peripheral device.

13. The mobile computing device of claim 9, wherein the instructions cause the one or more processors to transfer the audio playback from the mobile computing device to the peripheral device by at least causing the one or more processors to send, via at least one of the two or more wireless communication interfaces, a signal to the peripheral device that specifies an audio playback request, wherein the signal is sent using the second communication protocol.

14. The mobile computing device of claim 9, wherein the instructions further cause the one or more processors to:
send, to the peripheral device via at least one of the two or more wireless communication interfaces, a signal that specifies a modification to the audio playback that was specified by the user input that interacted with the control.

15. The mobile computing device of claim 9, where the instructions cause the one or more processors to initiate Near Field Communication transmissions for receipt by the peripheral device in response to the mobile computing device either (i) receiving the transmission from the peripheral device using the first communication protocol, or (ii) determining that a distance value satisfies a threshold value.

16. A non-transitory computer-readable storage medium encoded with instructions that, when executed by one or more processors of a mobile computing device, cause the one or more processors to:
receive a request for the mobile computing device to perform audio playback;
monitor a wireless communication channel;
receive a transmission from a peripheral device over the wireless communication channel using a first communication protocol, the transmission identifying the peripheral device, receipt of the transmission indicating that the mobile computing device is located within a first zone of proximity to the peripheral device;
determine, based on the wireless communication channel, whether the mobile computing device is within a second zone of proximity to the peripheral device, the second zone of proximity being smaller than the first zone of proximity, and wherein the second zone of proximity is associated with a distance indicative of near physical contact between the mobile computing device and the peripheral device;
responsive to receiving the transmission from the peripheral device using the first communication protocol and determining the mobile computing device is within the second zone of proximity:
initiate a second communication protocol that has a shorter range than the first communication protocol; and
modify a display of the mobile computing device to visually indicate that the mobile computing device is within the second zone of proximity to the peripheral device;
responsive to receiving data from the peripheral device using the second communication protocol, determine that the mobile computing device is located within a third zone of proximity to the peripheral device, the third zone of proximity being smaller than the second zone of proximity, and wherein the third zone of proximity is associated with a distance indicative of physical contact between the mobile computing device and the peripheral device;

responsive to determining that the mobile computing device is located within the third zone of proximity to the peripheral device, transfer the audio playback from the mobile computing device to the peripheral device; and receive user input that interacts with a control to modify the audio playback by the peripheral device.

17. The non-transitory computer-readable storage medium of claim 16, wherein the instructions further cause the one or more processors to:

modify the display of the mobile computing device to visually indicate that the mobile computing device is within the second zone of proximity to the peripheral device by at least causing the display to present an indication of a type of the peripheral device on the display of the mobile computing device without the mobile computing device receiving user input after receiving the transmission from the peripheral device.

18. The non-transitory computer-readable storage medium of claim 16, wherein the instructions further cause the one or more processors to:

transfer the audio playback from the mobile computing device to the peripheral device by at least sending a signal to the peripheral device that specifies an audio playback request using the second communication protocol.

19. The non-transitory computer-readable storage medium of claim 16, wherein the instructions further cause the one or more processors to:

send, to the peripheral device, a signal that specifies a modification to the audio playback that was specified by the user input that interacted with the control.

* * * * *